United States Patent [19]

Yamaki et al.

[11] Patent Number: 5,739,971
[45] Date of Patent: Apr. 14, 1998

[54] HEAD-POSITION CONTROLLING DEVICE

[75] Inventors: Hideaki Yamaki, Kanagawa-ken; Tomotaka Muramoto, Tokyo, both of Japan

[73] Assignee: Canon Kabushiki Kaisha, Tokyo, Japan

[21] Appl. No.: 279,266

[22] Filed: Jul. 21, 1994

Related U.S. Application Data

[63] Continuation of Ser. No. 741,635, Aug. 7, 1991, abandoned.

[30] Foreign Application Priority Data

Aug. 17, 1990 [JP] Japan ............... 2-217931

[51] Int. Cl.$^6$ ............... G11B 5/596; G11B 21/10
[52] U.S. Cl. ............... 360/77.06; 360/78.04; 369/32; 369/44.28
[58] Field of Search ............... 360/27, 75, 77.01, 360/77.02, 77.04, 77.06, 106, 109, 78.04, 78.05; 369/32, 44.28

[56] References Cited

U.S. PATENT DOCUMENTS

| | | | |
|---|---|---|---|
| 4,151,567 | 4/1979 | Dorsemagen et al. | 360/75 |
| 4,204,234 | 5/1980 | Noble | 360/77.06 |
| 4,445,153 | 4/1984 | Fujimoto et al. | 360/77.06 |
| 4,485,418 | 11/1984 | Bremmer | 360/77.02 |
| 4,513,332 | 4/1985 | Merritt et al. | 360/77.02 |
| 4,630,144 | 12/1986 | Kutayama | 360/77.06 |
| 4,689,700 | 8/1987 | Miyake et al. | 360/77.06 |
| 4,691,252 | 9/1987 | Okada et al. | 360/75 |
| 4,716,558 | 12/1987 | Katayama et al. | 360/78.06 |
| 4,731,680 | 3/1988 | Moriyama et al. | 360/78.13 |
| 5,010,423 | 4/1991 | Sakaegi et al. | 360/77.06 |
| 5,050,014 | 9/1991 | Maeda et al. | 360/75 |
| 5,073,835 | 12/1991 | Sano et al. | 360/77.04 |
| 5,091,806 | 2/1992 | Maeda et al. | 360/77.06 |
| 5,097,365 | 3/1992 | Takahashi | 360/77.06 |
| 5,227,931 | 7/1993 | Misumi | 360/77.06 |

FOREIGN PATENT DOCUMENTS

62-128077  6/1987  Japan ............... 360/77.06

*Primary Examiner*—William L. Sikes
*Assistant Examiner*—Tai V. Duong
*Attorney, Agent, or Firm*—Robin, Blecker, Daley and Driscoll

[57] ABSTRACT

A head-position controlling device includes a head moving mechanism for causing a head to move with respect to a recording track on a recording medium; a detecting circuit for detecting an amplitude of a reproduced signal which is reproduced from the recording track on the recording medium by the head; and a controlling circuit for controlling the head moving mechanism on the basis of an output of the detecting circuit. If so that if the amplitude of the reproduced signal is greater than a predetermined level, the head is made to move in units of a first moving amount to detect a position where the amplitude of the reproduced signal is a maximum, and if the amplitude of the reproduced signal is less than the predetermined level, the head is made to move in units of a second moving amount greater than the first moving amount. If the amplitude of the reproduced signal becomes greater than the predetermined level, the moving amount of the head is switched to the first moving amount.

26 Claims, 5 Drawing Sheets

HEAD-POSITION CONTROLLING DEVICE

This is a continuation application under 37 CFR 1.62 of prior application Ser. No. 07/741,635, filed Aug. 7, 1991, now abandoned.

BACKGROUND OF THE INVENTION

1. Field of the Invention

The present invention relates to a head-position controlling device for accurately positioning a head with respect to a recording track on a recording medium.

2. Description of the Related Art

Various kinds of information recording and reproducing apparatus for recording and reproducing information on and from a recording track on a recording medium have conventionally found various kinds of applications.

For example, in the field of video instruments which have recently become increasingly popular, particularly in the field of a still video camera or the like for recording and reproducing still image information on and from a plurality of concentric recording tracks on a magnetic disc called a video floppy disc, more effort is directed to increasing recording density to cope with reductions in the size of the recording medium and that of the apparatus and an increase in recording capacity.

However, if the recording density is increased, a number of problems arise such as the deformation of the recording medium itself due to temperature, variations in the characteristics of individual apparatus and errors introduced between recording and reproduction. Such a problem may not occur if recording and reproduction can be performed by using an identical apparatus in an identical environment. However, if reproduction is to be performed by using an apparatus which differs from that used for recording or if reproduction is to be performed in an environment which greatly differs from that of recording, it is difficult to accurately position a head on each extremely narrow track while causing the head to move from one recording track to another by means of only an open-loop head moving mechanism utilizing a stepping motor or the like.

To cope with the above-described problems, a so-called head tracking device has conventionally been used which detects the level of a reproduced signal picked up by a head and locates the head at a position where the reproduced signal level is a maximum.

Figure 1:
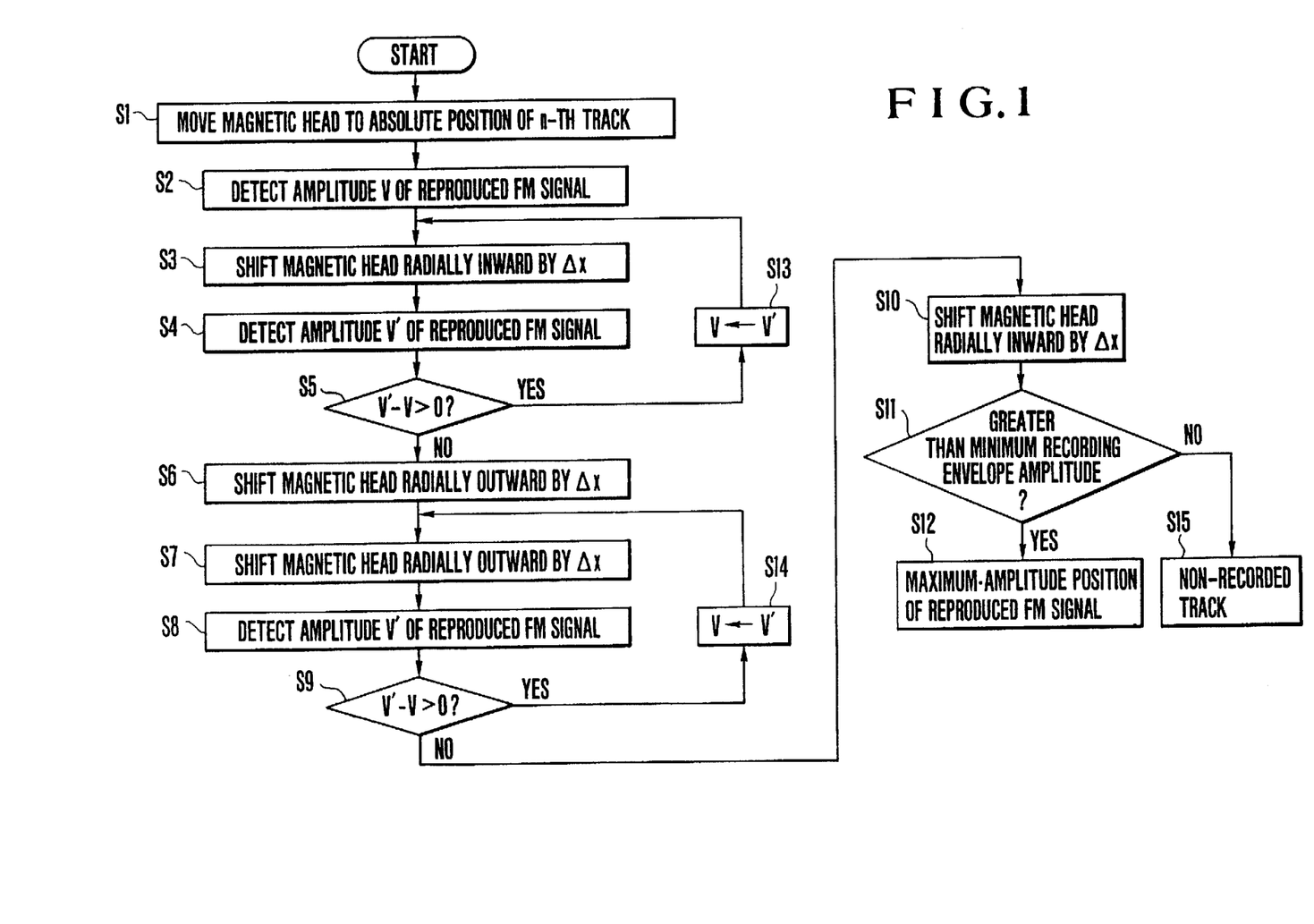
FIG. 1 is a flowchart for explaining the operation of a conventional type of head-position controlling device.

FIG. 1 is a flowchart of the operation of a typical example of a tracking device of the type which has conventionally been used, and shows the control operation of detecting the amplitude level of a reproduced FM signal which has been reproduced from a recording track on a recording medium and moving a magnetic head to a track position at which the reproduced amplitude reaches a maximum.

Referring to FIG. 1, the magnetic head is made to move to the absolute position (position determined according to a format) of an n-th track to be reproduced (Step S1), and the amplitude of a reproduced FM signal is detected. The obtained signal is inputted to the detecting circuit shown in FIG. 2, and the output of the detecting circuit is inputted to a logarithmic converter.

Figure 2:
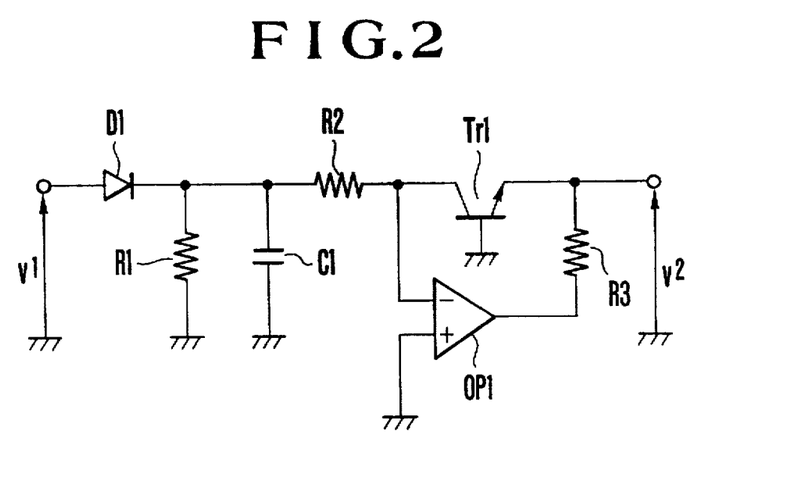
FIG. 2 is a circuit diagram showing the construction of a conventional detecting circuit.

The detecting circuit shown in FIG. 2 includes a diode D1, resistors R1, R2 and R3, a capacitor C1, an n-p-n transistor Tr1, and an operational amplifier OP1. The diode D1, the resistor R1 and the capacitor C1 constitute a detecting circuit, while the resistors R2 and R3, the n-p-n transistor Tr1 and the operational amplifier OP1 constitute a logarithmic converter. When a reproduced FM signal which has been reproduced by the magnetic head is applied to an input $v_1$, only the positive amplitude of the reproduced FM signal is passed by the diode D1 and the DC component of its envelope is obtained by the resistor R1 and the capacitor C1. A current proportional to this DC component flows through the resistor R2, so that logarithmic conversion is carried out by utilizing the forward characteristic of the p-n junction of the transistor TR1. Thus, a DC component V of the detected signal is measured by the above-described detecting circuit and logarithmic converter (Step S2).

Then, the magnetic head is made to move radially inward on a floppy disc by a moving amount $\Delta x$ (Step S3). When the movement of the magnetic head by the moving amount $\Delta x$ is completed, the amplitude of the envelope of a reproduced FM signal is measured at that position, and the resultant signal is passed through the detecting circuit and the logarithmic converter, whereby a DC component V' of the detected signal is measured (Step S4). The magnitudes of V' and V are compared with each other (Step S5). If the relation V'−V>0 is obtained, V' is substituted for the value of V (Step S13), and the magnetic head is made to move further by the moving amount $\Delta x$ in the radially inward direction which is the same as the direction of the last movement of the magnetic head (Step S3). When the further movement of the magnetic head by the moving amount $\Delta x$ is completed, the amplitude of the envelope of a reproduced FM signal is measured at that position, and the DC component V' of a detected signal is measured (Step S4). The value of V' is compared with the value V of the DC component of the detected signal which was measured at the position radially $\Delta x$ outward from the current position (Step S5). In the case of V'−V>0 at this time as well, the above-described operation is repeated. If the relation V'−V≦0 is obtained, the magnetic head is made to move by the moving amount $\Delta x$ in the radially outward direction which is opposite to the direction of the last movement (Step S6). Subsequently, the magnetic head is made to move further by the moving amount $\Delta x$ radially outward (Step S7). When the further movement of the magnetic head by the moving amount $\Delta x$ is completed, the amplitude of the envelope of a reproduced FM signal is measured at that position, and the DC component V' of a detected signal is measured (Step S8).

Then, the value of V' is compared with the value V of the DC component of the detected signal which was measured at the position radially $\Delta x$ inward from the current position (Step S9). If the relation V'−V>0 is obtained, V' is substituted for the value of V (step S14), and the magnetic head is made to move further by the moving amount $\Delta x$ in the radially outward direction which is the same as the direction of the last movement of the magnetic head (Step S7). When the further movement of the magnetic head by the moving amount $\Delta x$ is completed, the amplitude of the envelope of a reproduced FM signal is measured at that position, and the DC component V' of a detected signal is measured (Step S8). The value of V' is compared with the value V of the DC component of the detected signal which was measured at the position radially $\Delta x$ inward from the current position (Step S9). If the relation V'−V≦0 is obtained at this time, it indicates that the magnetic head is offset radially outward by $\Delta x$ from the position at which the magnetic head outputs a maximum amplitude. Accordingly, the magnetic head is made to move by $\Delta x$ radially inward (Step S10).

Then, a minimum recording amplitude value, which is set in advance, is compared with the amplitude of the reproduced FM signal (Step S11). If the amplitude of the reproduced FM signal is greater than the set value, it is found that the position of the magnetic head at that time is the maximum-amplitude position of the reproduced FM signal (Step S12). If the amplitude of the reproduced FM signal is less than the set value, it is found that the n-th track has not yet been recorded (Step S15).

However, as described above, during recording of video signals, a video signal may be recorded at a position offset from the absolute track position owing to the deformation of a recording medium due to temperature and variations in errors introduced by individual mechanisms. In addition, during reproduction, the magnetic head may be offset from the absolute track position. Accordingly, to detect the maximum amplitude of a reproduced FM signal, it is necessary to perform detection which takes into account a somewhat positional width relative to the absolute track position.

Accordingly, even if an initially detected amplitude is extremely small, a recording position or a reproducing position may be offset and detection of the maximum-amplitude position must be performed before and after that position.

In this case, however, since the obtained amplitude is extremely small and the magnetic head must be made to move in fine steps, the amount of variation of the amplitude of the detected reproduced FM signal is extremely small. This leads to the disadvantage that a logarithmic converter such as that shown in FIG. 2 must be connected to the output of a detecting circuit so that an amplitude variation can be expanded and amplified before it is detected.

Another disadvantage is that since the moving amount of the magnetic head is fixed to a fine step, it takes a long time to detect the maximum-amplitude position of the reproduced FM signal.

SUMMARY OF THE INVENTION

A first object of the present invention which has been devised to solve the above-described problems is to provide a head-position controlling device capable of achieving accurate and rapid head-position control irrespective of the state of a reproduced signal outputted from a head.

A second object of the present invention is to provide a head-position controlling device capable of performing high-sensitivity detection irrespective of a reproduced signal level to achieve accurate and rapid head-position control.

A third object of the present invention is to provide a head-position controlling device in which, if a reproduced signal level is greater than a predetermined level, the unit moving amount of a head is set to a normal fine amount of variation to increase the accuracy of detection of a maximum-amplitude position and in which, if the reproduced signal level is too small to reach the predetermined level, the unit moving amount of the head is increased to increase the amount of variation of the amplitude of the reproduced signal. As a result even if level expanding means is not used, such as a logarithmic converter which has conventionally been connected to the output side of a detecting circuit, it is possible to easily and accurately detect the amplitude variation of the reproduced signal level and it is also possible to accurately detect the direction of movement of the head and the maximum-amplitude position of the reproduced FM signal.

A fourth object of the present invention is to provide a head-position controlling device in which, initially, the unit moving amount of a magnetic head is set to a great value and the maximum-amplitude position of a reproduced FM signal is roughly detected and then the unit moving amount of the magnetic head is set to a small value to cause the magnetic head to move in finite steps before and after the maximum-amplitude position so that the maximum-amplitude position can be detected with high accuracy. Accordingly, even at a position remote from the maximum-amplitude position, where a reproduced signal level is low, a large amplitude variation can be obtained by increasing the unit moving amount of the head. It is thereby possible to reliably control the head without the use of a logarithmic converter or the like which would have conventionally been required.

To achieve the above-described objects, according to one aspect of the present invention, there is provided a head-position controlling device which includes head moving means for causing a head to move with respect to a recording track on a recording medium, detecting means for detecting an amplitude of a reproduced signal which is reproduced from the recording track on the recording medium by the head; and controlling means for controlling the head moving means on the basis of an output of the detecting means so that if the amplitude of the reproduced signal is greater than a predetermined level, the head is made to move in units of a first moving amount to detect a position where the amplitude of the reproduced signal is a maximum. If the amplitude of the reproduced signal is less than the predetermined level, the head is made to move in units of a second moving amount greater than the first moving amount and if the amplitude of the reproduced signal becomes greater than the predetermined level, the moving amount of the head is switched to the first moving amount.

According to another aspect of the present invention, there is provided a head-position controlling device which includes head moving means for causing a head to move with respect to a recording track on a recording medium, detecting means for detecting an amplitude of a reproduced signal which is reproduced from the recording track on the recording medium by the head, and controlling means for controlling the head moving means on the basis of an output of the detecting means to switch a unit moving amount of the head between a first moving amount and a second moving amount greater than the first moving amount; wherein the controlling means is arranged to cause the head to move in units of the second moving amount to detect a maximum-amplitude position where the amplitude of the reproduced signal is a maximum, and then to switch the moving amount of the head to the first moving amount and cause the head to move before and after the maximum-amplitude position, thereby detecting the position where the amplitude of the reproduced signal is the maximum.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings in conjunction with a case where a head-position controlling device according to the present invention is applied to a still video camera apparatus.

First of all, the diagrammatic construction of the still video camera apparatus to which the present invention is applied will be described with reference to FIG. 4.

Figure 4:
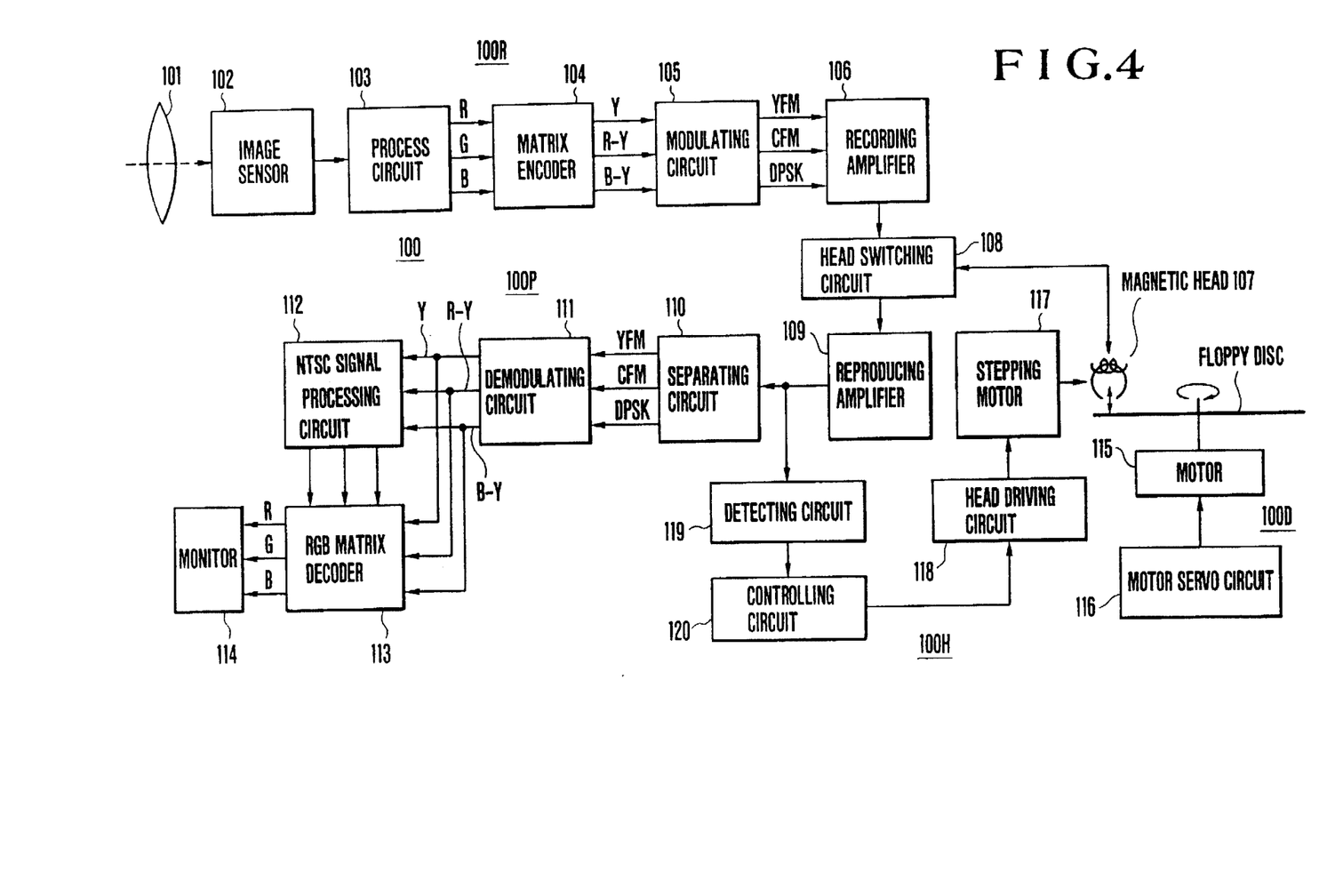
FIG. 4 is a block diagram showing the construction of a still video camera to which the head-position controlling device according to the present invention is applied.

In FIG. 4, the entire still video camera is indicated generally by reference numeral 100, a recording part by reference numeral 100R, a reproducing part by 100P, a disc rotating part by reference numeral 100D, and a head driving control part by reference numeral 100H.

The recording part 100R includes a photographic lens 101, an image sensor 102, such as a CCD, for photoelectrically converting an image formed by the photographic lens 101 into an image signal, a process circuit 103 for separating the image signal outputted from the image sensor 102 into color signals R, G and B and performing predetermined processing on them, such as white level adjustment, black level adjustment, white balance adjustment and gamma conversion, a matrix encoder 104 for converting the RGB signals outputted from the process circuit 103 into a luminance signal and color-difference signals and outputting these signals, and a modulating circuit 105 for applying predetermined processing, such as pre-emphasis, to the luminance signal and performing frequency-modulation of the resultant signal to convert it into a signal format suitable for recording on a floppy disc, namely, a magnetic disc. The modulating circuit 105 also applies color-difference line-sequential conversion and pre-emphasis to the color-difference signals and then frequency-modulates the resultant signal. At the same time, the modulating circuit 105 applies DPSK (differential phase-shift keying) modulation to an ID signal including various kinds of control information such as track management information, identification of field/frame, and the year, month and day of photography, and outputs the DPSK-modulated ID signal together with the aforesaid luminance and color-difference signals.

The recording part 100R also includes a recording amplifier 106 for mixing and frequency-multiplexing the frequency-modulated luminance and color-difference signals and the DPSK-modulated ID signal, amplifying the frequency-multiplexed signal to a predetermined level, and supplying it to a magnetic head 107. The recording part 100R also includes a head switching circuit 108 for switching the magnetic head 107 between the recording part 100R and a reproducing part 100P.

The reproducing part 100P includes a reproducing amplifier 109 for amplifying a reproduced FM signal obtained from the floppy disc by the magnetic head 107 to a predetermined level, a separating circuit 110 for separating the reproduced FM signal outputted from the reproducing amplifier 109 into a luminance FM signal, color-difference FM signals and a DPSK-modulated signal, and a demodulating circuit 111 for demodulating each of the signals separated by the separating circuit 110 and effecting predetermined processing such as de-emphasis, dropout compensation, line interpolation and skew compensation. Further, the demodulating circuit 111 converts the color-difference line-sequential signal into color-difference line-simultaneous signals.

The reproducing part 100P also includes an NTSC signal processing circuit 112 which consists of an NTSC encoder for converting the luminance signal and color-difference line-simultaneous signals outputted from the demodulating circuit 111 into an NTSC signal and an NTSC decoder for converting the NTSC signal outputted from the NTSC encoder into the luminance signal and the color-difference line-simultaneous signals, an RGB matrix decoder 113 for effecting conversion into RGB signals, and a monitor 114.

The disc rotating part 100D includes a motor 115 for rotating the floppy disc, and a motor servo circuit 116 for controlling the motor 115 to cause the disc to rotate at a predetermined constant speed (3,600 r.p.m.) during recording or reproduction.

The head driving control part 100H constitutes the gist of the present invention and includes, as shown in FIG. 4, a head-moving stepping motor 117 for causing the magnetic head 107 to move via a head moving mechanism (not shown), a head driving circuit 118 for driving the stepping motor 117, a detecting circuit 119 for detecting the envelope of a reproduced FM signal reproduced from the floppy disc by the magnetic head 107 and detecting the amplitude level of the reproduced FM signal, and a control circuit 120 for controlling the head driving circuit 118 to cause the magnetic head 107 to move to a specified arbitrary recording track. The control circuit 120 is also arranged to obtain information on the amplitude of the reproduced FM signal detected by the detecting circuit 119 and control the head driving circuit 118 to place the magnetic head 107 at a position on the target track where a reproduced signal level is a maximum.

The still video camera according to the present invention has the above-described construction and arrangement. Then, the head position controlling operation of the still video camera during reproduction will be described with reference to the flowchart of FIG. 3.

Figure 3:
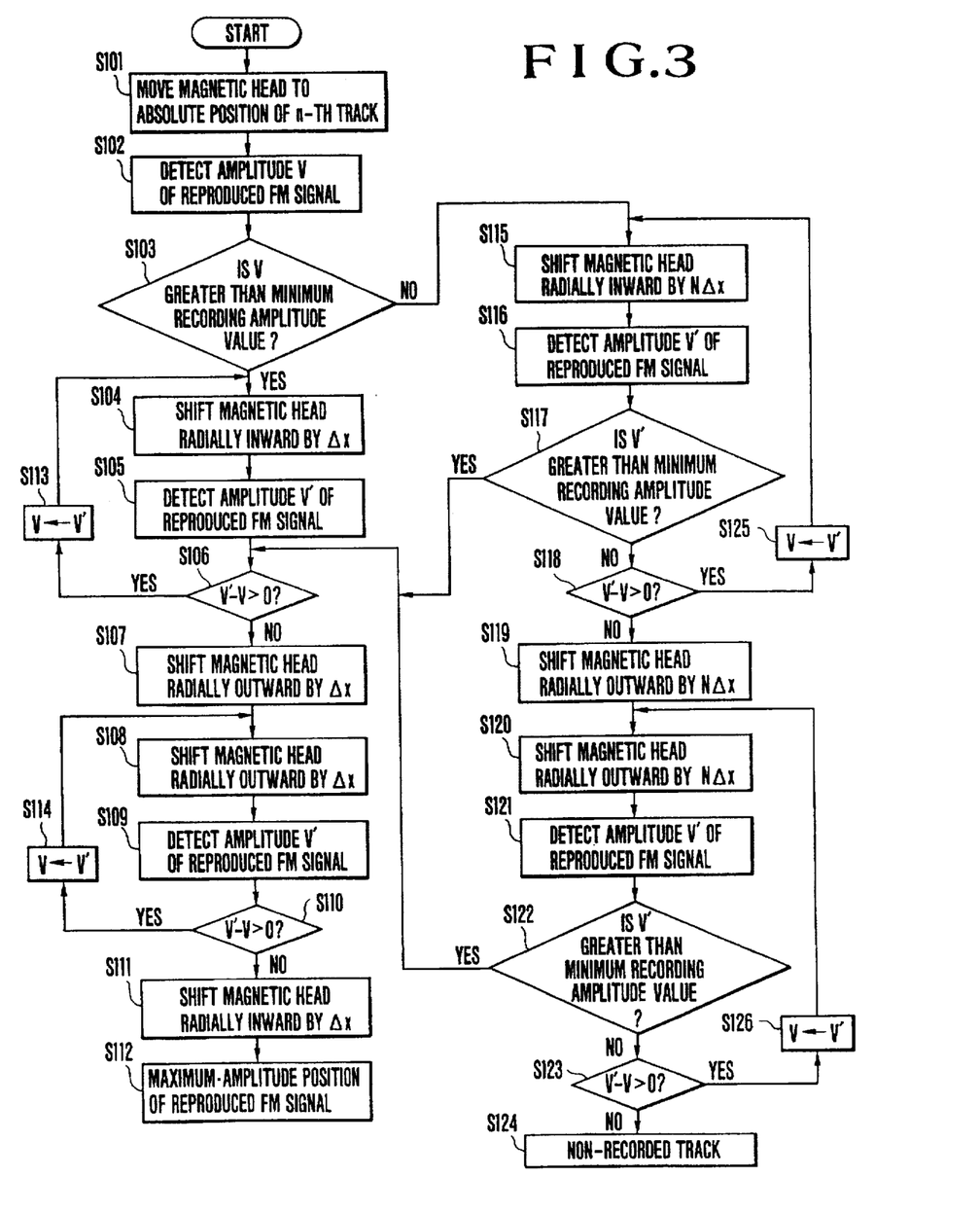
FIG. 3 is a flowchart for explaining a first embodiment of a head-position controlling device according to the present invention.

The flowchart of FIG. 3 shows the head movement controlling operation of the control circuit 120 of the head driving control part 100H. In practice, the flowchart is stored as a control program in a ROM incorporated in the control circuit 120.

When the control flow is started, the magnetic head 107 is made to move to the absolute position (position determined according to a format) of an arbitrary n-th track to be reproduced (Step S101), and the amplitude of a reproduced FM signal is measured by the detecting circuit 119. The detecting circuit 119 is constructed as shown in FIG. 5, and a DC component V of a detected signal outputted from the detecting circuit 119 is measured (Step S102).

Figure 5:
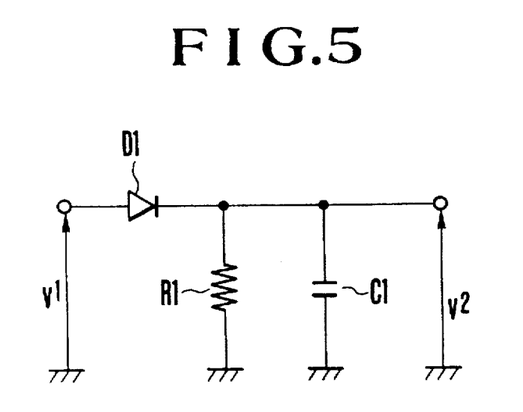
FIG. 5 is a circuit diagram showing the construction of a detecting circuit according to the present invention.

Referring to FIG. 5, an element D1 is a diode for passing only the positive amplitude of an input signal, and elements R1 and C1 are a resistor and a capacitor, respectively, which constitute a circuit for obtaining the positive DC component of the input signal.

By passing an input signal $v_1$ through the detecting circuit 119, an amplitude $v_2$ of the reproduced FM signal proportional to the input can be detected at the output.

In general, a video signal is not always recorded at an absolute position on each track, and a magnetic head may be offset during recording or offset from the absolute position during reproduction. Accordingly, the absolute position is not always an optimum head position.

To cope with this problem, a minimum recording amplitude value, which is set in advance, is compared with the previously detected amplitude V of the reproduced FM signal (Step S103). If the amplitude V is less than the set value, the magnetic head 107 is made to move radially inward on the floppy disc by a moving amount NΔx (N=2) which is two times the normal moving amount per unit step, Δx, of the magnetic head 107 (Step S115). When the movement of the magnetic head 107 by the moving amount 2Δx is completed, an amplitude V' of a reproduced FM signal is detected at that position (Step S116).

Subsequently, V' is compared with the set minimum recording amplitude value (Step S117), and if V' is less than the set minimum recording amplitude value, V' and V are compared with each other (Step S118). If the relation V'−V>0 is obtained, V' is substituted for the value of V (Step S125) and the process proceeds to Step S115. In Step S115, the magnetic head 107 is made to move further by the moving amount 2Δx in the radially inward direction which is the same as the direction of the last movement of the magnetic head 107. When the further movement of the magnetic head 107 by the moving amount 2Δx is completed, the amplitude V' of a reproduced FM signal is detected at that position (Step S116). The detected value is again compared with the set minimum recording amplitude value (Step S117), and if V' is less than the set minimum recording amplitude value, V' is compared with V (Step S118).

If the relation V'−V≦0 is obtained, the magnetic head 107 is made to move by the moving amount 2Δx in the direction (radially outward) opposite to the direction of the last movement (Step S119). Subsequently, the magnetic head is made to move further by the moving amount 2Δx radially outward (Step S120). When such further movement of the magnetic head 107 is completed, the amplitude V' of a reproduced FM signal is detected at that position (Step S121).

Then, V' is compared with the set minimum recording amplitude value (Step S122), and if V' is less than the set minimum recording amplitude value, V' is compared with the value of the amplitude V which was detected at the position radially 2Δx inward from the current position (Step S123). If the relation V'−V>0 is obtained, V' is substituted for the value of V (Step S126) and the process returns to Step S120. In Step S120, the magnetic head 107 is made to move further by the moving amount 2Δx in the radially outward direction. When the further movement of the magnetic head 107 by the moving amount 2Δx is completed, the amplitude V' of a reproduced FM signal is detected at that position (Step S121).

Then, this V' is compared with the set minimum recording amplitude value (Step S122), and if V' is less than the set minimum recording amplitude value, V' is compared with V (Step S123). If the relation V'−V≦0 is obtained, it indicates that V' is less than the set minimum recording amplitude value and the n-th track has not yet been recorded (Step S124).

The following is a description of a case where it has been determined in Step S103 that the amplitude V of the reproduced FM signal detected in Step S102 is greater than the set minimum recording amplitude value.

In this case, the magnetic head 107 is made to move radially inward by the moving amount Δx (Step S104). When the movement of the magnetic head 107 by the moving amount Δx is completed, the amplitude V' of a reproduced FM signal is detected at that position (Step S105). The value V' is compared with V (Step S106).

If the relation V'−V>0 is obtained, V' is substituted for the value of V (Step S113) and the process proceeds to Step S104. In Step S104, the magnetic head 107 is made to move further radially inward by the moving amount Δx. When the further movement of the magnetic head 107 by the moving amount Δx is completed, the amplitude V' of a reproduced FM signal is detected at that position (Step S105) and this V' is compared with V (Step S106).

If it is determined in Step S117 or S122 that the amplitude V' of the reproduced FM signal which has been detected is greater than the set minimum recording amplitude value, the process proceeds to Step S106, where a comparison between V' and V is made.

If the relation V'−V>0 is obtained in Step S106, the process proceeds to Step S113. If the relation V'−V≦0 is obtained, the magnetic head 107 is made to move radially outward by the moving amount Δx (Step S107). Subsequently, the magnetic head 107 is made to move further by the moving amount Δx radially outward (Step S108).

When such further movement of the magnetic head 107 is completed, the amplitude V' of a reproduced FM signal is detected at that position (Step S109), and this V' is compared with the value of V (Step S110).

If the relation V'−V>0 is obtained, V' is substituted for the value of V (Step S114) and the magnetic head 107 is made to move radially outward by the moving amount Δx (Step S108). When the further movement of the magnetic head 107 by the moving amount Δx is completed, the amplitude V' of a reproduced FM signal is detected at that position (Step S109) and this V' is compared with V (Step In the case of V'−V≦0, the magnetic head 107 is made to move radially inward by the moving amount Δx (Step S111). The position reached by the magnetic head 107 at that time is the maximum-amplitude position of the reproduced FM signal (step S112).

In accordance with the above-described embodiment, if the amplitude of a detected reproduced FM signal is less than the set minimum recording amplitude value, the moving amount of the magnetic head is set to two times the normal moving amount of the magnetic head (2Δx). Accordingly, the difference (amount of variation) between the amplitudes of reproduced FM signals which are detected before and after the movement of the magnetic head can be made large. Accordingly, it is not necessary to amplify the amount of variation by connecting a logarithmic converter to the output of the detecting circuit, whereby the construction of the device can be simplified and the magnetic head can be controlled rapidly and with high accuracy.

A second embodiment of the present invention will be described below. The construction of the second embodiment is substantially identical to that of the first embodiment shown in FIG. 4, and the difference between the first and second embodiments resides in a head movement control program which is stored in the head driving control part 100H.

Figure 6:
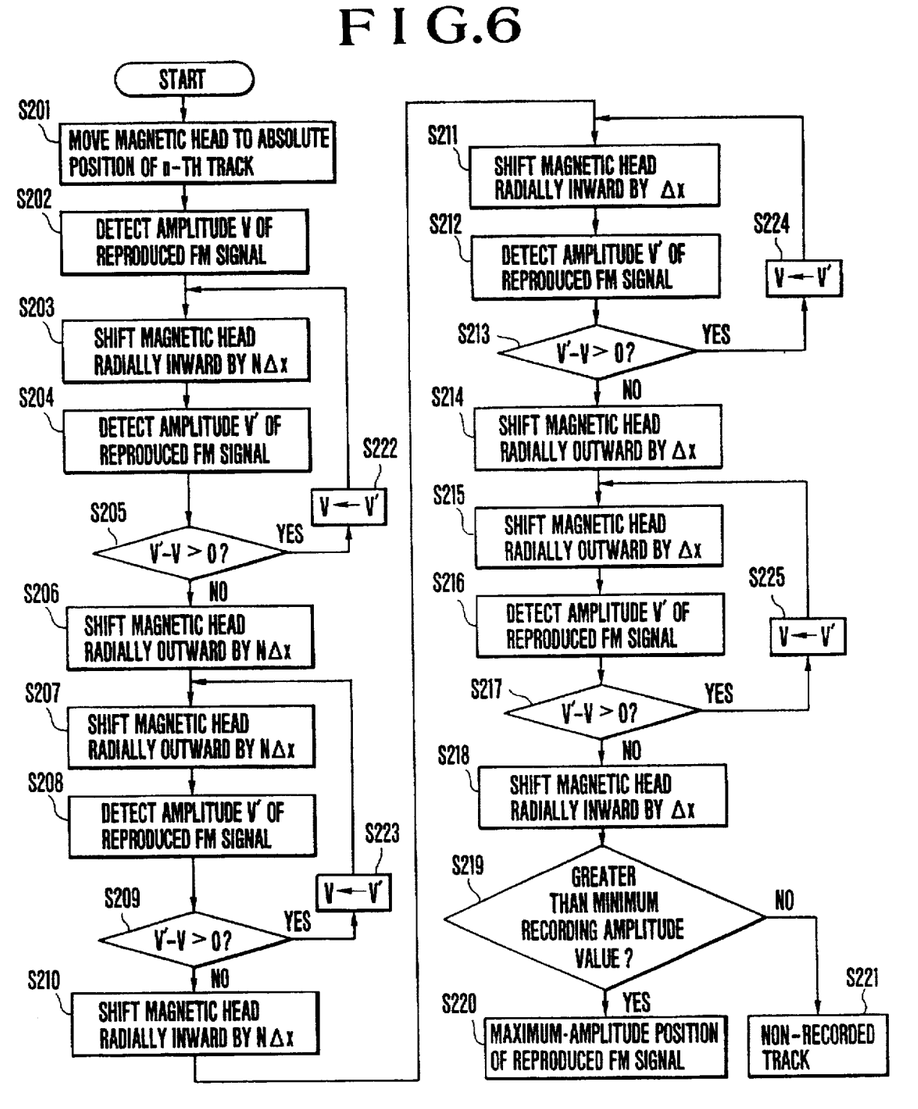
FIG. 6 is a flowchart for explaining a second embodiment of the head-position controlling device according to the present invention.

FIG. 6 is a flowchart showing the second embodiment of the present invention.

When the control flow is started, the magnetic head 107 is made to move to the absolute position (position determined according to the format) of the arbitrary n-th track to be reproduced (Step S201), and the amplitude of a reproduced FM signal is measured by the detecting circuit 119. The detecting circuit 119 is constructed as shown in FIG. 5, and the DC component V of a detected signal outputted from the detecting circuit 119 is measured (Step S202).

Referring to FIG. 5, the element D1 is the diode D1 for passing only the positive amplitude of an input signal, and the elements R1 and C1 are the resistor and the capacitor, respectively, which constitute the circuit for obtaining the positive DC component of the input signal.

By passing the input signal $v_1$ through the detecting circuit 119, the amplitude $v_2$ of the reproduced FM signal proportional to the-input can be detected at the output.

The magnetic head 107 is made to move radially inward on the floppy disc by a moving amount NΔx (N is an integer and NΔx indicates a moving amount which is N times the unit moving amount Δx of the magnetic head 107 during normal movement) (Step S203). When the movement of the magnetic head 107 by the moving amount NΔx is completed, the amplitude V' of a reproduced FM signal is detected at that position (Step S204), and this V' is compared with V (Step S205).

If the relation V'–V>0 is obtained, V' is substituted for the value of V (Step S222) and the process proceeds to Step S203. In Step S203, the magnetic head 107 is made to move further by the moving amount NΔx in the radially inward direction which is the same as the direction of the last movement of the magnetic head 107. When the further movement of the magnetic head by the moving amount NΔx is completed, the amplitude V' of a reproduced FM signal is detected at that position (Step S204), and V' is compared with V (Step S205). In Step S205, if the relation V'–V≦0 is obtained, the magnetic head 107 is made to move by the moving amount NΔx in the direction (radially outward) opposite to the direction of the last movement (Step S206), and further by the moving amount NΔx radially outward (Step S207).

When such further movement of the magnetic head 107 is completed, the amplitude V' of a reproduced FM signal is detected at that position (Step S208), and this V' is compared with V (Step S209).

If the relation V'–V>0 is obtained, V' is substituted for the value of V (Step S223) and the process returns to Step S207. In Step S207, the magnetic head 107 is made to move further by the moving amount NΔx in the radially outward direction. When the further movement of the magnetic head 107 by the moving amount NΔx is completed, the amplitude V' of a reproduced FM signal is detected at that position (Step S208), and this V' is again compared with V (Step S209).

If the relation V'–V≦0 is obtained in Step S209, the magnetic head 107 is made to move radially inward by the moving amount NΔx (Step S210). The position reached by the magnetic head 107 at that time is the maximum-amplitude position of the reproduced FM signal.

On the basis of the maximum-amplitude position, the unit moving amount of the magnetic head 107 is set to the normal moving amount Δx, and the maximum-amplitude position of the reproduced FM signal is further detected with higher accuracy while the magnetic head 107 is being made to move in finite steps.

First, the magnetic head 107 is made to move radially inward by the moving amount Δx (Step S211). When the movement of the magnetic head 107 by the moving amount Δx is completed, the amplitude V' of a reproduced FM signal is detected at that position (Step S212), and this V' is compared with V (Step S213).

If the relation V'–V>0 is obtained in Step S213, V' is substituted for the value of V (Step S224) and the process returns to Step S211. In Step S211, the magnetic head 107 is made to move further by the moving amount Δx in the radially inward direction which is the same as the direction of the last movement of the magnetic head 107. When the further movement of the magnetic head by the moving amount Δx is completed, the amplitude V' of a reproduced FM signal is detected at that position (Step S212), and V' is compared with V (Step S213).

If the relation V'–V≦0 is obtained, the magnetic head 107 is made to move by the moving amount Δx in the direction opposite to the direction of the last movement, that is, in the radially outward direction, (Step S214), and further by the moving amount Δx radially outward (Step S215).

When such further movement of the magnetic head 107 is completed, the amplitude V' of a reproduced FM signal is detected at that position (Step S216), and this V' is compared with V (Step S217).

If the relation V'–V>0 is obtained in Step S217, V' is substituted for the value of V (Step S225) and the process returns to Step S215. In Step S215, the magnetic head 107 is made to move further by the moving amount Δx in the radially outward direction. When the further movement of the magnetic head 107 by the moving amount Δx is completed, the amplitude V' of a reproduced FM signal is detected at that position (Step S216), and this V' is compared with V (Step S217).

If the relation V'–V≦0 is obtained in step S217, the magnetic head 107 is made to move radially inward by the moving amount Δx (Step S218). When the movement of the magnetic head 107 by the moving amount Δx is completed, the amplitude of a reproduced FM signal is detected at that position, and this amplitude is compared with the set minimum recording amplitude value (Step S219). If the amplitude of the reproduced FM signal is less than the set value, it is determined that the n-th track is a non-recorded track (Step S221). If the amplitude of the reproduced FM signal is greater than the set value, it is determined that the position reached by the magnetic head 107 at this time is the maximum-amplitude position of the reproduced FM signal (Step S220).

As described above, the unit moving amount of the magnetic head is set to a great value and to a position where the amplitude of a reproduced FM signal is a maximum and is roughly detected. Then, the unit moving amount of the magnetic head is set to a small value to a position where the amplitude of the reproduced FM signal is detected with a higher precision. Accordingly, it is possible to realize rapid and highly accurate head position control.

In addition, even if the amount of offset from a track is large and a reproduced signal level is low during an initial state immediately after a tracking operation has been initiated, the initial moving amount of the magnetic head is set to a great value so that the variation of the reproduced signal level can be detected as a large variation. Accordingly, it is possible to prevent a wrong decision from being made as to the direction of movement of the magnetic head, whereby accurate head movement can be achieved.

As is apparent from the foregoing description, in accordance with the head-position controlling device according to the first embodiment of the present invention, if a reproduced signal level is greater than a predetermined level, the unit moving amount of the head is set to a normal finite amount of variation to increase the accuracy of detection of the maximum-amplitude position. If the reproduced signal level is too small to reach the predetermined level, the unit moving amount of the head is increased to increase the amount of variation of the amplitude of the reproduced signal. Accordingly, it is possible to easily and accurately detect the amplitude variation of the reproduced signal level without the use of a level expanding means such as a logarithmic converter which has conventionally been connected to the output side of a detecting circuit. It is, therefore, possible to improve detection sensitivity and detection accuracy, and also to accurately detect the direction of movement of the head and the maximum-amplitude position of the reproduced FM signal. If the reproduced signal level is low and the offset of the magnetic head from a track is large, the unit moving amount of the magnetic head becomes large, whereby the time required to detect a position where the amplitude of the reproduced signal is a maximum is reduced so that high-speed head position control can be realized.

In addition, since a circuit such as a logarithmic converter can be omitted, a mounting area, power consumption and cost can be reduced.

In accordance with the head-position controlling device according to the second embodiment of the present invention, initially, the unit moving amount of the magnetic head is set to a great value and the maximum-amplitude position of a reproduced FM signal is roughly detected. Then, the unit moving amount of the magnetic head is set to a small value to cause the magnetic head to move in finite steps before and after the maximum-amplitude position so that the maximum-amplitude position can be detected with high accuracy. Accordingly, even if the amount of offset from a track is large and a reproduced signal level is low during an initial state immediately after a tracking operation has been initiated, the initial moving amount of the magnetic head is set so that the variation of the reproduced signal level can be detected as a large variation. Accordingly, it is possible to prevent a wrong decision from being made as to the direction of movement of the magnetic head, whereby accurate head movement can be achieved and the speed of head-position controlling operation can be increased.

In consequence, even at a position remote from the maximum-amplitude position, where a reproduced signal level is low, a large amplitude variation can be obtained by increasing the unit moving amount of the head. Accordingly, it is possible to reliably control the head without the use of a logarithmic converter or the like which would have conventionally been required.

What is claimed is:

1. A method of controlling a position of a head with respect to a recording track on recording medium, comprising the steps of:
   (A) moving the head with respect to the recording track on the recording medium;
   (B) detecting a level of a reproduced signal which is reproduced from the recording track on the recording medium by the head; and
   (C) controlling movement of the head to change a moving characteristic of the head on the basis of the detected level of the reproduced signal so that, in the case that the detected level of the reproduced signal is lower than a predetermined level, the head is moved at a first moving amount in one of inward and outward direction in which a detected level of the newly reproduced signal becomes greater than a previously detected level, and in the case that the detected level of the reproduced signal becomes greater than said predetermined level, the head is moved at a second moving amount which is smaller than the first moving amount in a second moving mode in one of inward and outward direction in which a detected level of the newly reproduced signal becomes greater than a previously determined level and stopped at a position where the level of the reproduced signal is maximum.

2. A method according to claim 1, wherein the recording medium is a disc-like recording medium and the recording track is one of a plurality of concentric tracks.

3. A method according to claim 2, wherein the head is moved by means of a stepping motor, and the changing of the moving characteristic of the head is performed by varying the number of unit moving steps of the stepping motor.

4. A method according to claim 3, wherein the number of unit moving steps of the stepping motor is varied in accordance with a result of comparing the detected level of the reproduced signal with said predetermined level, and said result varies relative to a distance between a present position of the head and a position of the head where the level of the reproduced signal is maximized.

5. A method according to claim 1 or 4, wherein the second moving amount is N (N:integer) times the first moving amount.

6. A method of controlling a position of a head with respect to a recording track on a recording medium, comprising the steps of:
   (A) moving the head with respect to the recording track on the recording medium;
   (B) detecting a level of a reproduced signal which is reproduced from the recording track on the recording medium by the head; and
   (C) controlling movement of the head in an inward or outward direction on the basis of the detected level of the reproduced signal to change a head moving amount between units of a first moving amount and units of a second moving amount which is greater than the first moving amount, by moving the head in units of the second moving amount while detecting the level of the reproduced signal at respective head positions to detect a position at which the detected level is maximized, and in response to detection of said detected position at which the detected level is maximized, changing the head moving amount of the head to the first moving amount and moving the head before and behind said detected position, to automatically position the head at a most suitable position for maximizing the level of the reproduced signal by moving the head in the inward direction or the outward direction.

7. A method according to claim 6, wherein the head is moved by means of a stepping motor, and the moving amount of the head is changed by varying the number of unit moving steps of the stepping motor.

8. A method according to claim 6 or 7 wherein the second moving amount is N (N:integer) times the first moving amount.

9. A method of performing tracking control with respect to a head for reproducing a record track on a recording medium, the method comprising the steps of:
   (A) moving the head in a direction crossing the record track in a selected one of a first head moving mode for moving the head in units of a first amount and a second head moving mode for moving the head in units of a second amount which is larger than said first amount;
   (B) detecting a level of a reproduced signal which is reproduced from the recording track by the head; and
   (C) changing over the moving modes in which the head is moved on the basis of the detected level of the reproduced signal so that, when the detected level of the reproduced signal is lower than a predetermined level, the head is moved in the second head moving mode at the second amount in one of inward and outward direction in which a detected level of the newly reproduced signal becomes greater than a previously detected level by detecting a variation of the level of the reproduced signal when the head is moved in the inward or outward direction while detecting the level of the reproduced signal at respective head positions, and when the level of the reproduced signal detected at one of said respective head positions exceeds said predetermined level, changing over the head moving mode from the second moving mode to the first moving mode to move the head at the first amount smaller than the second amount in one of inward and outward direction in which a detected level of the newly reproduced signal becomes maximum by detecting a variation of the detected level of the reproduced signal when the head is moved in the inward or outward direction, to position the head at a position where the level of the reproduced signal is maximized.

10. A method according to claim 9, wherein the head is moved by means of a stepping motor.

11. A method according to claim 10 wherein a unit driving step of the stepping motor is changed over, depending on the first head moving mode and the second head moving mode.

12. A method according to claim 9, wherein the level of the reproduced signal is detected by detecting an envelope of the reproduced signal.

13. A method according to claim 9, wherein said recording medium is a magnetic disc.

14. Apparatus for controlling a position of a head with respect to a recording track on a recording medium, comprising:

(A) means for moving the head with respect to the recording track on the recording medium;

(B) means for detecting a level of a reproduced signal which is reproduced from the recording track on the recording medium by the head; and (C) means for controlling movement of the head to change a moving characteristic of the head on the basis of the detected level of the reproduced signal so that, in the case that the detected level of the reproduced signal is lower than a predetermined level, the head is moved at a first moving amount in one of inward and outward direction in which a detected level of the newly reproduced signal becomes greater than a previously detected level, and in the case that the detected level of the reproduced signal becomes greater than said predetermined level, the head is moved at a second moving amount which is smaller than the first moving amount in a second moving mode in one of inward and outward direction in which a detected level of the newly reproduced signal becomes greater than a previously determined level and stopped at a position where the level of the reproduced signal is maximum.

15. An apparatus according to claim 14, wherein the recording medium is a disc-like recording medium and the recording track is one of a plurality of concentric tracks.

16. An apparatus according to claim 15, wherein the means for moving the head is a stepping motor, and the changing of the moving characteristic of the head is performed by varying the number of unit moving steps of the stepping motor.

17. An apparatus according to claim 16, wherein the number of unit moving steps of the stepping motor is varied in accordance with a result of comparing the detected level of the reproduced signal with said predetermined level, and said result varies relative to a distance between a present position of the head and a position of the head where the level of the reproduced signal is maximized.

18. An apparatus according to claim 14 or 17 wherein the second moving amount is N (N:integer) times the first moving amount.

19. Apparatus for controlling a position of a head with respect to a recording track on a recording medium, comprising:

(A) means for moving the head with respect to the recording track on the recording medium;

(B) means for detecting a level of a reproduced signal which is reproduced from the recording track on the recording medium by the head; and (C) means for controlling movement of the head in an inward or outward direction on the basis of the detected level of the reproduced signal to change a head moving amount between units of a first moving amount and units of a second moving amount which is greater than the first moving amount, by moving the head in units of the second moving amount while detecting the level of the reproduced signal at respective head positions to detect a position at which the detected level is maximized, and in response to detection of said detected position at which the detected level is maximized, changing the head moving amount of the head to the first moving amount and moving the head before and behind said detected position, to automatically position the head at a most suitable position for maximizing the level of the reproduced signal by moving the head in the inward direction or the outward direction.

20. An apparatus according to claim 19, wherein the means for moving the head is a stepping motor, and the moving amount of the head is changed by varying the number of unit moving steps of the stepping motor.

21. An apparatus according to claim 19 or 20, wherein the second moving amount is N (N:integer) times the first moving amount.

22. An apparatus for performing tracking control with respect to a head for reproducing a record track on a recording medium, the method comprising the steps of:

(A) means for moving the head in a direction crossing the record track in a selected one of a first head moving mode for moving the head in units of a first amount and a second head moving mode for moving the head in units of a second amount which is larger than said first amount;

(B) means for detecting a level of a reproduced signal which is reproduced from the recording track by the head; and (C) means for changing over the moving modes in which the head is moved on the basis of the detected level of the reproduced signal so that, when the detected level of the reproduced signal is lower than a predetermined level, the head is moved in the second head moving mode at the second amount in one of inward and outward direction in which a detected level of the reproduced signal becomes greater than a previously detected level by detecting a variation of the level of the reproduced signal when the head is moved in the inward or outward direction while detecting the level of the reproduced signal at respective head positions, and when the level of the reproduced signal detected at one of said respective head positions exceeds said predetermined level, changing over the head moving mode from the second moving mode to the first moving mode to move the head at the first amount smaller than the second amount in one of inward and outward direction in which a detected level of the newly reproduced signal becomes maximum by detecting a variation of the detected level of the reproduced signal when the head is moved in the inward or outward direction, to position the head at a position where the level of the reproduced signal is maximized.

23. An apparatus according to claim 22, wherein said means for moving said head is a stepping motor.

24. An apparatus according to claim 23, wherein a unit driving step of the stepping motor is changed over, depending on the first head moving mode and the second head moving mode.

25. An apparatus according to claim 22, wherein the level of the reproduced signal is detected by detecting an envelope of the reproduced signal.

26. An apparatus according to claim 22, wherein said recording medium is a magnetic disc.

* * * * *

UNITED STATES PATENT AND TRADEMARK OFFICE
CERTIFICATE OF CORRECTION

PATENT NO. : 5,739,971
DATED : April 14, 1998
INVENTOR(S) : Hideaki Yamaki, et al.

It is certified that error appears in the above-identified patent and that said Letters Patent is hereby corrected as shown below:

Title Page, Item [57] Abstract, line 8, delete "so that if".

Col. 8, line 29, after "Step" (second occurrence) insert -- 110 --.

Col. 9, line 6, delete "-".

Signed and Sealed this

Twenty-second Day of December, 1998

Attest:

BRUCE LEHMAN

*Attesting Officer*      *Commissioner of Patents and Trademarks*